United States Patent [19]

Noggle

[11] Patent Number: 5,193,948
[45] Date of Patent: Mar. 16, 1993

[54] CHIP CONTROL INSERTS WITH DIAMOND SEGMENTS

[75] Inventor: Kenneth G. Noggle, West Bloomfield, Mich.

[73] Assignee: GTE Valenite Corporation, Troy, Mich.

[21] Appl. No.: 807,481

[22] Filed: Dec. 16, 1991

[51] Int. Cl.$^5$ ............... B23B 27/20; B23B 27/22
[52] U.S. Cl. ............................ 407/116; 407/119
[58] Field of Search .................. 407/114–116, 407/119, 118; 408/144, 145; 51/293, 307–309

[56] References Cited

U.S. PATENT DOCUMENTS 4,854,784  8/1989  Murray et al. ............ 407/119 X
4,991,467  2/1991  Packer .................... 408/144 X Primary Examiner—Steven C. Bishop
Attorney, Agent, or Firm—Bill C. Panagos

[57] ABSTRACT

An insert having a cutting segment of a polycrystalline diamond or cubic boron wafered between two layers of a hard metal carbide is bonded into a pocket in a standard insert and machined to form a chip breaker having a clearance surface and expose the cutting edge of polycrystalline material integral with the cutting segment.

9 Claims, 1 Drawing Sheet

CHIP CONTROL INSERTS WITH DIAMOND SEGMENTS

BACKGROUND OF THE INVENTION

1. Field of the Invention

The present invention relates to chip control inserts having diamond segments or other polycrystalline segments adhered thereto to provide excellent cutting, longevity of tool life, and good chip control.

The present invention further relates to an insert having a pocket at its forward end and extending at least partially through the body substrate. A cutting means is interfaced between two wafers of bondable material and bonded into the pocket at one wafer and the other wafer is ground away to form a chip breaker.

2. Description of the Prior Developments

Murray et al., U.S. Pat. No. 4,854,784 discloses a diamond tipped chip control insert which incorporates a polycrystalline diamond or cubic boron nitride material therein as a cutting edge material. The insert substrate includes integral chip control features which eliminate the need for the use of separately attached mechanical chip breakers.

Murray et al differs from the present invention because Murray et al first form a chip breaker from a solid insert, then at one nose portion the insert is provided with a slot which accommodates a polycrystalline diamond material. The diamond is then bonded to the insert in the slot. In the present invention, the chip breaker is formed in the wafer comprised of tungsten carbide/polycrystalline diamond/tungsten carbide after it is bonded to the insert substrate.

Jurgens, U.S. Pat. No. 4,498,549 discloses a cutting member for a rotary drill bit comprised of a substrate to which is bonded a polycrystalline material. The drill does not have any chip breaking features and neither does it utilize the tungsten carbide/polycrystalline diamond/tungsten carbide wafer of the present invention.

Bibbs, Jr. et al., U.S. Pat. No. 4,605,343 discloses a sintered polycrystalline diamond compact having an integral metallic heat sink bonded to and covering at least the outer diamond surface. The metallic heat sink is used to increase compact life when the compact is used for material removal without fluid coolant. The present invention does not require a metallic heat sink to achieve dry cutting and further includes a chip breaker which is absent from Bibbs Jr. et al.

Slutz et al., U.S. Pat. No. 4,899,922 disclose a brazed, thermally stable polycrystalline diamond compact having a network of interconnected empty pores dispersed throughout the compact and bonded to a substrate by a brazing filler metal which may be an alloy having a liquidus above about 700 degrees centigrade. Slutz relates to a manner of bonding the polycrystalline diamond to a substrate. There is no showing in Slutz of using a polycrystalline diamond compact as a metal cutting insert with built in chip control features.

SUMMARY OF THE INVENTION

The present invention relates to a cutting insert, comprising a substrate having an upper surface, a lower surface and a side wall extending substantially unbroken there between, wherein the upper surface has a pocket, extending at least partially through the insert body, to define a floor and, preferably, at least one wall. A cutting means, such as a polycrystalline diamond composite wafered between two layers of tungsten carbide, is adapted to be mounted and bonded into the floor of the pocket and preferably abutting the aforementioned wall to present a tight fit in the pocket. Those skilled in the art recognize that the polycrystalline segment could be adhered to the upper surface of the insert without the need to provide a pocket in the insert. The inset segment is then subjected to grinding to remove some of the tungsten carbide upper wafer and expose the polycrystalline diamond. The removal of tungsten carbide presents a chip breaker and exposes some diamond for cutting. The present invention avoids the shortcomings of the prior art, and especially Murray et al, in that the composite is brazed or bonded along the floor and wall of the pocket. Murray requires that the polycrystalline diamond composite be bonded along at least three sides, and, because of the brazing techniques available, will not allow a uniform product insofar as the location of the polycrystalline diamond within the pocket is concerned.

Moreover, the present invention allows the formation of the chipbreaker integrally with the polycrystalline diamond composite, thereby reducing manufacturing costs.

DETAILED DESCRIPTION OF THE PREFERRED EMBODIMENTS

Figure 1:
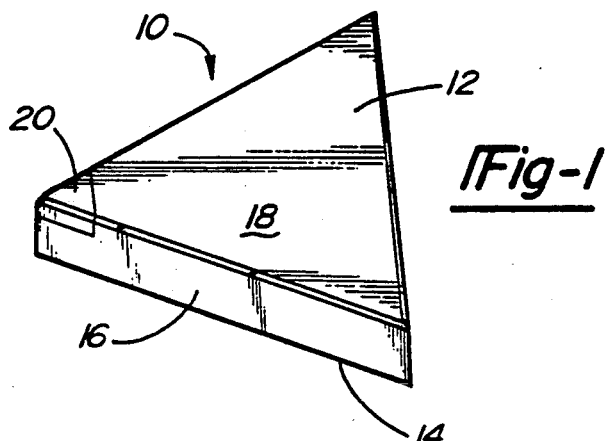
FIG. 1 is a top perspective view of the insert of the present invention.
Figure 2:
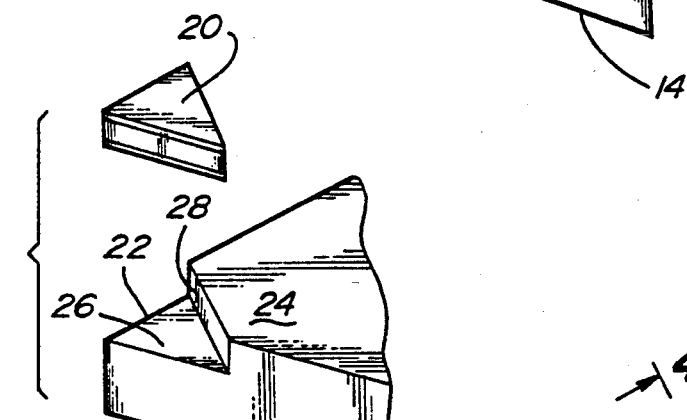
FIG. 2 is a detail of the nose portion of the insert showing the pocket and polycrystalline diamond composite wafer.

Turning now to the figures, wherein like numerals depict like structures, FIG. 1 depicts a top perspective view of the polygonal shaped chip control insert 10 of the present invention showing upper surface 12, lower surface 14 and sidewall 16 extending substantially unbroken therebetween to define a body 18 of the insert. The insert body is comprised of a cemented carbide such as tungsten carbide or any other hard composite or alloyed sintered metallic composite, such as are well known to those skilled in the art. A composite cutting means 20, such as a polycrystalline diamond composite or a cubic boron composite material is positioned and bonded within a pocket 22 at nose portion 24 of the insert. The pocket has a floor 26, and at least one wall 28. Those skilled in the art recognize that the pocket may have two or more walls, such as a diamond shaped pocket. Those skilled in the art recognize that the pocket may also be any shape, as long as the inset is retained therein. Also, the pocket may be eliminated and the polycrystalline wafer may be brazed directly to the upper surface of the insert.

Figure 3:
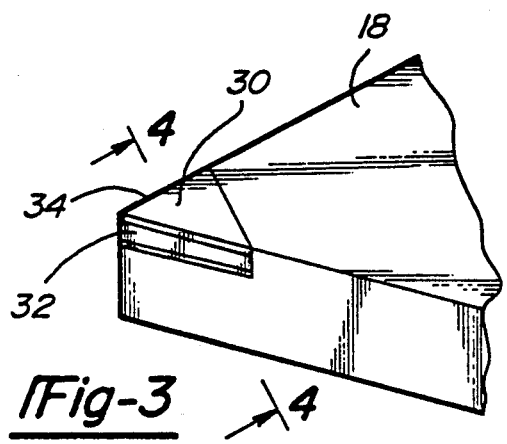
FIG. 3 is a detail of the nose portion of the insert showing the polycrystalline composite bonded into the pocket.

Turning to FIG. 3, there is shown a detailed side perspective of the insert in place on the nose portion of the insert. Note that the pocket is of such depth that the cutting means segment, when placed in the pocket and bonded in place such by brazing, the upper surface 30 of the segment is coplanar with the upper surface of the insert, and the sides 32 and 34 of the segment are coplanar with the sidewalls of the insert body. Thus, the cutting means segment is seen to fill the pocket and correspond to the configuration of the insert body.

Figure 4:
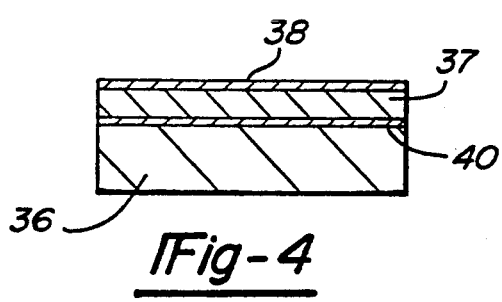
FIG. 4 is a side sectional view of the polycrystalline diamond composite wafer taken along line 4—4 showing the different layers to its construction.

Turning to FIG. 4, there is seen a cross section of the segment in place in the pocket taken along line 4—4 of FIG. 3. The segment is bonded against the floor of the insert body substrate 36. The segment has a polycrystalline diamond composite or a polycrystalline cubic boron composite to which are bonded two wafers of tungsten carbide or other similar hard metals, 38 and 40, respectively to present a sandwich construction of the segment. The segment is bonded into place onto the substrate of the body at the floor of the pocket by brazing or by other means such a epoxy, such as are well known by those skilled in the art.

Figure 5:
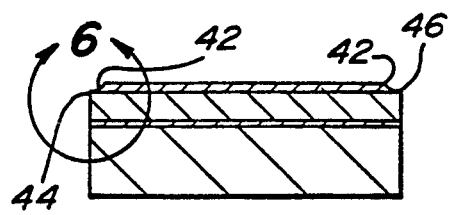
FIG. 5 is a side sectional detail of the polycrystalline diamond composite section showing the chipbreaker formed therein.
Figure 6:
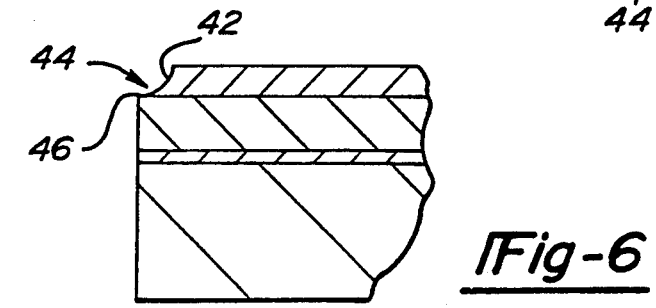
FIG. 6 is a detail of portion 6 of FIG. 5 showing the chip breaker in greater detail.

Turning now to FIG. 5, there is shown therein the chipbreakers which are formed in the upper surface of the segment after it is bonded into place in the pocket. Specifically, chipbreaker 42 is ground into the upper surface of the segment thereby exposing the cutting means at the chip breaker groove 44 to present a cutting edge 46, as seen in FIG. 6. The chip breaker is seen as being concave so as to present at least one clearance surface in close proximity to the cutting edge. Those skilled in the art recognize that any manner of chip breaker may be formed.

The cutting means is preferably a polycrystalline diamond composite, generally available as DRILpax , from Mega Diamond, a division of Smith International, Inc., of Provo, Utah. The entire insert may be adapted to be clamped or otherwise suitable held within a tool holder or blade in the manner which are well known to those skilled in the art.

Those skilled in the art recognize that many modifications are possible to the above described invention without departing from the scope and spirit of the invention as claimed.

I claim:

1. An insert for cutting material, comprising:
   a substrate having an upper surface, a lower surface, a forward end and means for defining a sidewall extending substantially therebetween to define the body of the insert, said upper surface having a polycrystalline cutting means segment bonded thereto wherein said polycrystalline material is interposed between two wafers of a material, at least one of said wafers being bondable to said upper surface and said other wafer being machinable to form a chip breaker to expose the polycrystalline material to form a cutting edge and clearance surface.

2. The insert of claim 1, further including a pocket formed in the upper surface of the insert into which the cutting means segment is mounted, said pocket extending at least partially through the insert body and formed at said forward end, said pocket having a floor and at least one side wall, and the cutting means segment is bonded onto the floor and abutting said wall of the pocket.

3. The insert of claim 1, wherein said cutting means segment is a polycrystalline diamond material composite wafered between two layers of a hard cemented carbide material.

4. The insert of claim 1, wherein said cutting means segment is a polycrystalline cubic boron material composite wafered between two layers of a hard cemented carbide material.

5. The insert of claim 1, wherein said wafers are comprised of tungsten carbide.

6. The insert of claim 1, wherein said insert is polygonal in shape.

7. The insert of claim 1, wherein said cutting means segment is brazed onto said upper surface.

8. The insert of claim 1, wherein said cutting means segment is provided with a clearance surface integral with the chip breaker and in close proximity to the cutting edge.

9. The insert of claim 1, wherein said cutting means segment is bonded onto said upper surface and a chipbreaker is then machined into said segment to expose the cutting edge.

* * * * *